Figure 1:
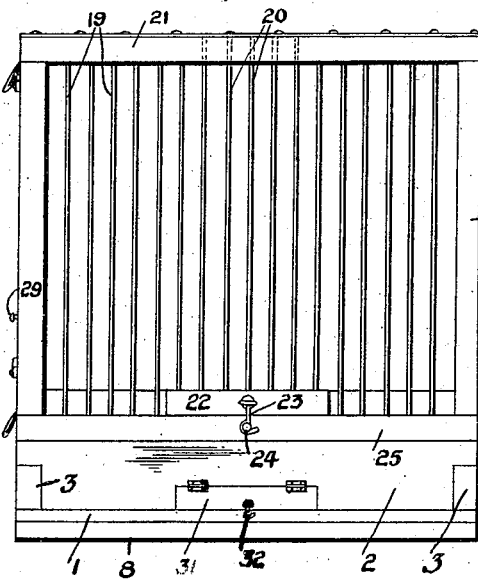

No. 877,393.

PATENTED JAN. 21, 1908.

T. BALL.
POULTRY CRATE OR COOP.
APPLICATION FILED JULY 9, 1906.

Witnesses:
Jesse C. Miller
D. C. H. Butler

Inventor:
Thomas Ball
by H. C. Evert & Co.
Attorneys.

THE NORRIS PETERS CO., WASHINGTON, D. C.

UNITED STATES PATENT OFFICE.

THOMAS BALL, OF NEW CASTLE, PENNSYLVANIA.

POULTRY CRATE OR COOP.

No. 877,393.  Specification of Letters Patent.  Patented Jan. 21, 1908.

Application filed July 9, 1906. Serial No. 325,327.

*To all whom it may concern:*

Be it known that I, THOMAS BALL, a citizen of the United States of America, residing at New Castle, in the county of Lawrence and State of Pennsylvania, have invented certain new and useful Improvements in Poultry Crates or Coops, of which the following is a specification, reference being had therein to the accompanying drawing.
This invention relates to wooden receptacles, and the invention relates more particularly to certain new and useful improvements in poultry crates and coops.

The invention has for its object to provide a simple and inexpensive crate, which can be knocked down and folded in a neat and compact form, to facilitate shipping, handling and storing.

Another object of this invention is to provide a crate or coop particularly designed for display purposes.

With the above and other objects in view, which will more readily appear as the nature of the invention is better understood, the same consists in the novel construction, combination and arrangement of parts to be presently described in detail and specifically pointed out in the appended claims.

Referring to the drawing forming part of this specification, like numerals of reference designate corresponding parts throughout the several views in which:—

Figure 2:
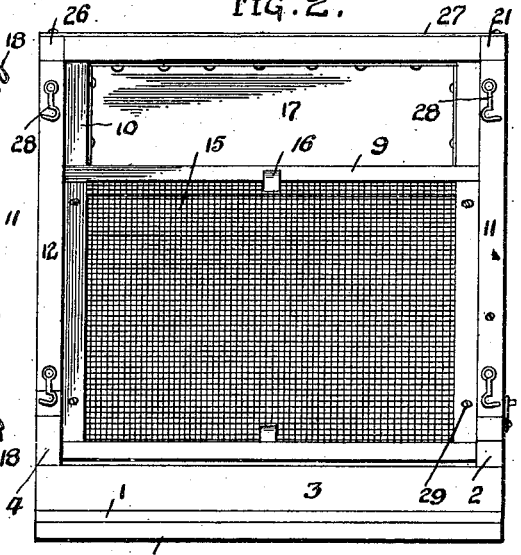
Figure 3:
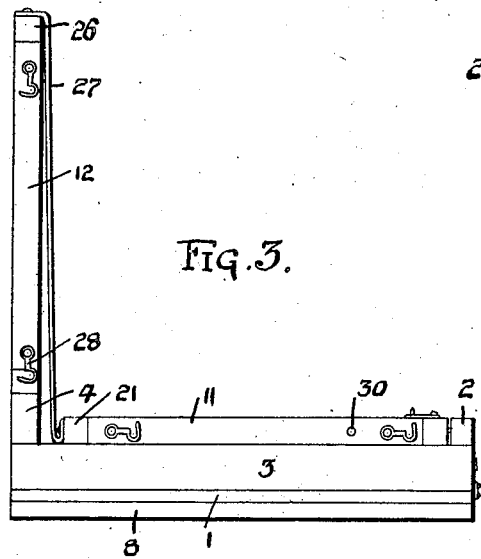
Figure 4:
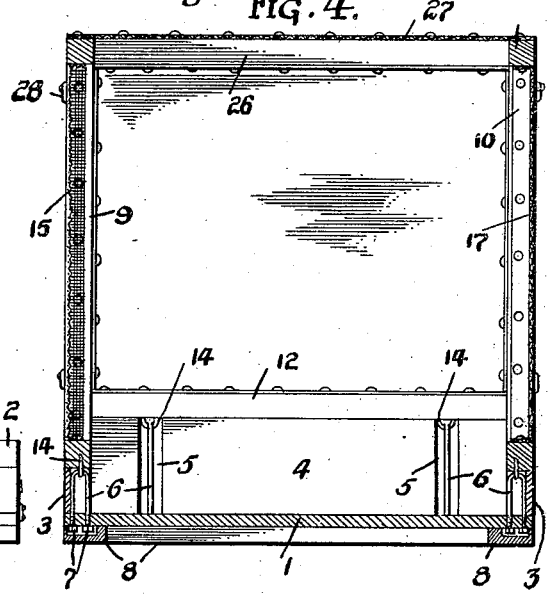
Figure 5:
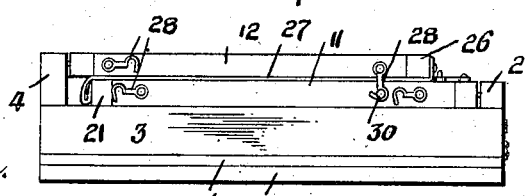

Figure 1 is a front elevation of my improved crate, Fig. 2 is a side elevation of the same, illustrating one of the side frames partly folded inwardly, Fig. 3 is a similar view, showing the crate as partially folded, Fig. 4 is a vertical sectional view of the crate in a set up condition, and Fig. 5 is an elevation of the crate in a knock down condition.

My improved crate or coop comprises a bottom plate 1, an auxiliary front wall, auxiliary side walls 3, and an auxiliary rear wall 4, these walls supporting suitable frames and a top cover adapted to fold inwardly upon the plate 1 and form a compact package or bundle.

The inner sides of the auxiliary walls are cut away or grooved as at 5 and extending into said grooves are vertically disposed clips 6, said clips being secured in the bottom plate 1, by nuts 7 threaded upon their lower ends. The nuts are protected and shielded by strips 8 secured upon the bottom edges of the plate 1, these strips being recessed to house the nuts 7.

Hinged to the clips 6 are side frames 9 and 10, a front frame 11 and a rear frame 12. The lower edges of said frames are provided with depending staples 14 which engage the upper ends of the clips 6, and permit of the frames being folded inwardly one upon the other. The side frame 9 is provided with a woven wire fabric 15 and its upper and lower edges with hand straps or grips 16 which permit of the frame 9 being easily manipulated. The side frame 10 is provided with a piece of fabric 17 and with hand grips or straps 18. The rear frame 12 is similarly constructed, with the exception that the hand straps are dispensed with.

The front frame 11 is provided with a plurality of vertically disposed bars or rods 19, the centralmost bars or rods 20 being slidably mounted in the top rail 21 of said frame. The lower ends of bars or rods 20 are mounted in a transversely disposed slide bar 22 mounted upon two of the rods or bars 19. The rods or bars 20 serve as a door for the coop or crate and they are locked in a closed position by a hook 23, carried by the bar 22 and engaging a pin 24, carried by the lower rail 25 of the front frame 11.

The top rail 26 of the rear frame 12 and the top rail 21 of the front frame 11 are connected together by a piece of fabric or flexible material 27, which serves as a cover or top for the crate or coop.

To maintain the side frames in a set-up form or vertical position, I provide the vertical edges of the frames 11 and 12 with hooks 28 adapted to engage over pins 27 carried by the vertical edges of the frames 9 and 10.

The side frame 9 is adapted to fold inwardly upon the bottom plate 1, the side frame 10 upon the side frame 9, and then the front frame 11 upon the side frames, the rear frame 12 being loosely folded thereon, and locked in its closed position, by one of the hooks 25 of said frame engaging a pin 30 carried by the edge of the frame 11. When the frames are in a folded position, the flexible top or cover 27 lies between the frames 11 and 12.

In order that the crate or coop can be easily cleaned while being used, I provide the front auxiliary wall 2 with a hinged lid or gate 31, said lid or gate being maintained in a closed position by a hook and pin 32.

By referring to Fig. 5, it will be observed that the crate or coop when folded forms a neat and compact bundle, which permits of a plurality of crates or coops being stored away, whereby they will occupy a comparatively small space. This feature of my invention is of great advantage when the crates or coops are being returned, after having reached a certain destination, and are packed in a freight or express car.

Such changes in the size, and minor details of construction, as are permissible by the claim, may be resorted to without departing from the spirit and scope of the invention.

What I claim and desire to secure by Letters Patent, is:—

A knock-down crate or coop comprising a bottom plate, auxiliary front, rear and side walls mounted upon said plate, said auxiliary front wall having an opening, each of said walls having upon the inner face thereof a plurality of vertically-extending grooves, side front and rear frames mounted upon each of said walls, means extending through the grooves and bottom plate and connected to said frame for hinging the latter to the walls and for connecting the walls to the plate, a strip of fabric of a width equal to the width of and connected at its ends to the front and rear frames, said strip of fabric constituting the top for the crate when the front and rear frames are in an upright position, a fabric attached to certain of said frames, vertically-extending rods carried by the other of said frames, certain of said rods being vertically adjustable to form an entrance opening for the crate, means for maintaining said frames in an upright position, means for securing the frames together when in a knock-down position, and a gate hinged to the front wall for closing said opening.

In testimony whereof I affix my signature in the presence of two witnesses.

THOMAS BALL.

Witnesses:
 CHAS. V. WALLS,
 S. W. LEWIS.